United States Patent [19]

Zdepski et al.

[11] Patent Number: 5,005,082
[45] Date of Patent: Apr. 2, 1991

[54] VIDEO SIGNAL COMPANDER ADAPTIVELY RESPONSIVE TO PREDICTIONS OF THE VIDEO SIGNAL PROCESSED

[75] Inventors: Joel W. Zdepski, Lebanon; Joshua L. Koslov, East Windsor, both of N.J.

[73] Assignee: General Electric Company, Princeton, N.J.

[21] Appl. No.: 416,695

[22] Filed: Oct. 3, 1989

[51] Int. Cl.$^5$ .......................... H04N 5/52; H04N 7/12
[52] U.S. Cl. ...................................... 358/174; 358/12; 358/135; 358/117
[58] Field of Search ................. 358/174, 27, 166, 167, 358/141, 133, 135, 136, 105, 177, 11, 12

[56] References Cited

U.S. PATENT DOCUMENTS

| | | | |
|---|---|---|---|
| 4,355,304 | 10/1982 | Kasuga et al. | 340/347 |
| 4,516,167 | 5/1985 | Dion et al. | 358/160 |
| 4,518,994 | 5/1985 | Schnitzler | 358/133 |
| 4,575,749 | 3/1986 | Acampora et al. | 358/27 |
| 4,851,904 | 7/1989 | Miyazaki et al. | 358/21 R X |

FOREIGN PATENT DOCUMENTS 2196205 4/1988 United Kingdom .
2203012 10/1988 United Kingdom .

OTHER PUBLICATIONS

A. A. Acampora et al, "Noise Reduction in Video Signals Using Pre/Post Signal Processing in a Time Division Multiplexed Component System", RCA Review, vol. 47, Sep. '86, pp. 303-344.
"Sound Transmission for HDTV Using Baseband Multiplexing into MUSE Video Signal", IEEE Trans. on Broadcasting, vol. BC-33, No. 4. Dec. '87.

Primary Examiner—Victor R. Kostak
Attorney, Agent, or Firm—Joseph S. Tripoli; Eric P. Herrmann; James B. Hayes

[57] ABSTRACT

A video signal transmission system includes adaptive compansion circuitry to improve the signal-to-noise ratio of transmitted signals. A compandor at the transmitter, and corresponding inverse compandor at the receiver, are arranged to have a plurality of selectable compansion transfer characteristics. Selection of particular ones of the transfer characteristics is responsive to, e.g., predicted values of current signal.

20 Claims, 7 Drawing Sheets

FIGURE 5A
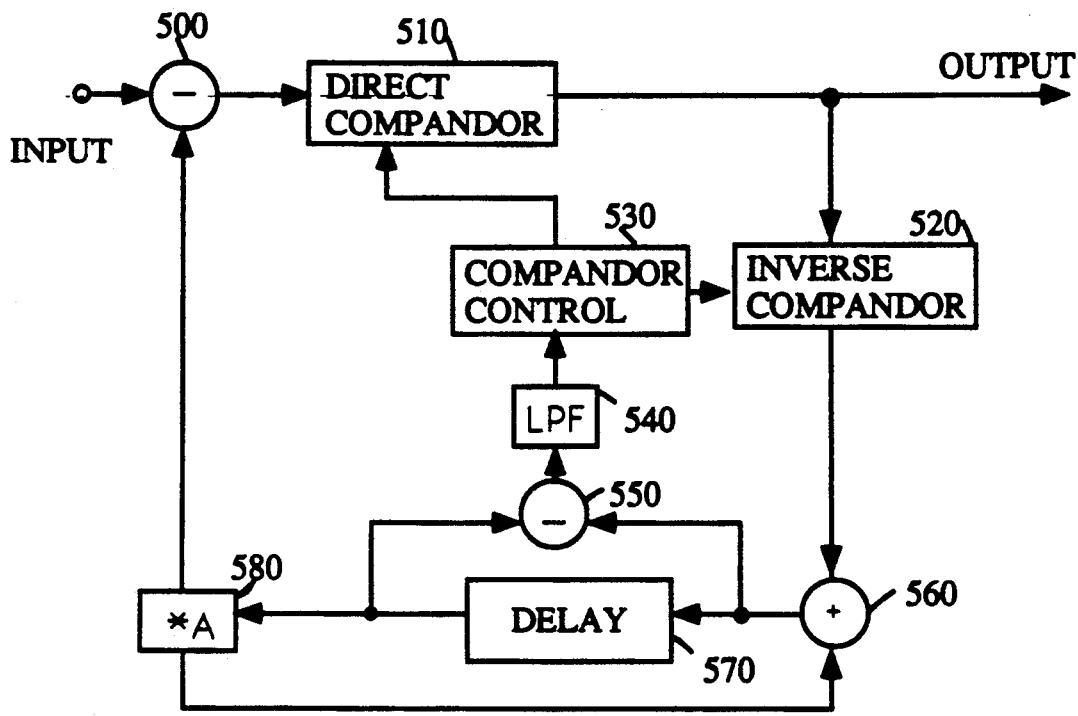
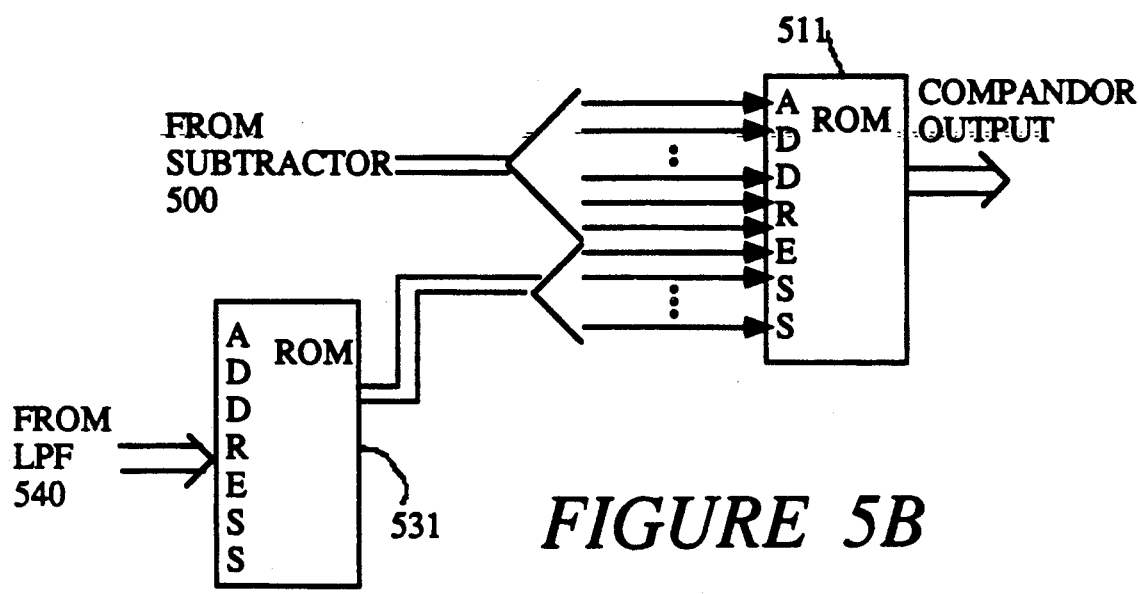
FIGURE 5B

VIDEO SIGNAL COMPANDER ADAPTIVELY RESPONSIVE TO PREDICTIONS OF THE VIDEO SIGNAL PROCESSED

This invention concerns a video signal noise reduction system employing companding and predictive signal processing.

Transmitting a video signal such as a television signal over a potentially noisy channel typically involves considerations of how to prevent channel noise from degrading the signal-to-noise ratio of the video signal and the quality of a reproduced picture. Companding is one way to improve the quality of a video signal conveyed in a noisy environment. In companding, the amplitude of a video signal is compressed at the transmitter, thereby raising its average-to-peak power ratio and hence its immunity to noise. The signal is amplitude expanded at the receiver with the inverse transfer function of the transmitter compression function, to restore the original video signal amplitude distribution so as to obtain a correct signal for display. When non-linear compression is performed at the transmitter, the signal is modified by means of a combination of small signal expansion and large signal compression. Complementary functions are performed at the receiver.

Noise power is reduced as a function of the slope of the compandor transfer function. The steeper the slope the greater the noise reduction. The region of the compandor transfer function having a steep slope is limited by dynamic range considerations. For most signals, the dynamic range of the signal over different intervals of time is different. If one had knowledge a priori of the relative dynamic range over the different time intervals, one could adjust the compandor transfer function to operate optimally for the respective intervals. Note however that the relative dynamic range information must be available to both the transmitting and receiving end of the compansion system.

It is well known that video signals from horizontal line-to-horizontal line or frame-to-frame are highly redundant. Due to this redundancy the amplitude values of video signal can be predicted with relatively high accuracy. Knowing the relative amplitude of the current video signal, via prediction from prior occurring signal, one can determine the instantaneous dynamic range of the signal over respective signal intervals. Using predicted values of successively occurring video signal an adaptive compansion system can be implemented in a video signal transmission system.

Nonlinear amplitude compression at the transmitter can produce unwanted out-of-band high frequency signal components, e.g., above 4.2 MHz in the case of a television type video signal. These unwanted high frequency components can be removed by a transmitter output low pass filter. However, removal of frequency components at the transmitting end tends to affect the accuracy of the complementary expansion function at the receiver.

Nominally noise in reproduced images is less objectionable in images containing object motion than in still images. In addition, for temporally processed video signals at the transmitter, a nonlinear compansion process creates greater out of band components for moving images than for still images. Therefore, it is advantageous to compand video signals with differing compansion functions depending upon the degree of motion in respective reproduced images, that is to perform greater compansion for temporally processed still images and lesser compansion for temporally processed moving images.

The present invention is a video signal transmitting system including a compandor having a plurality of selectable compansion characteristics. Circuitry is included for predicting, e.g., the amplitude of a video signal and responsive thereto determining the particular compansion characteristic to be used.

BRIEF DESCRIPTION OF THE DRAWINGS

FIGS. 5A and 6 are block diagrams of adaptive compansion circuitry in the transmitting and receiving portions respectively of a television signal transmitting system.

FIG. 5B is a block diagram of circuitry which may be utilized to realize the direct compandor and compandor control elements of FIG. 5A.

Figure 1:
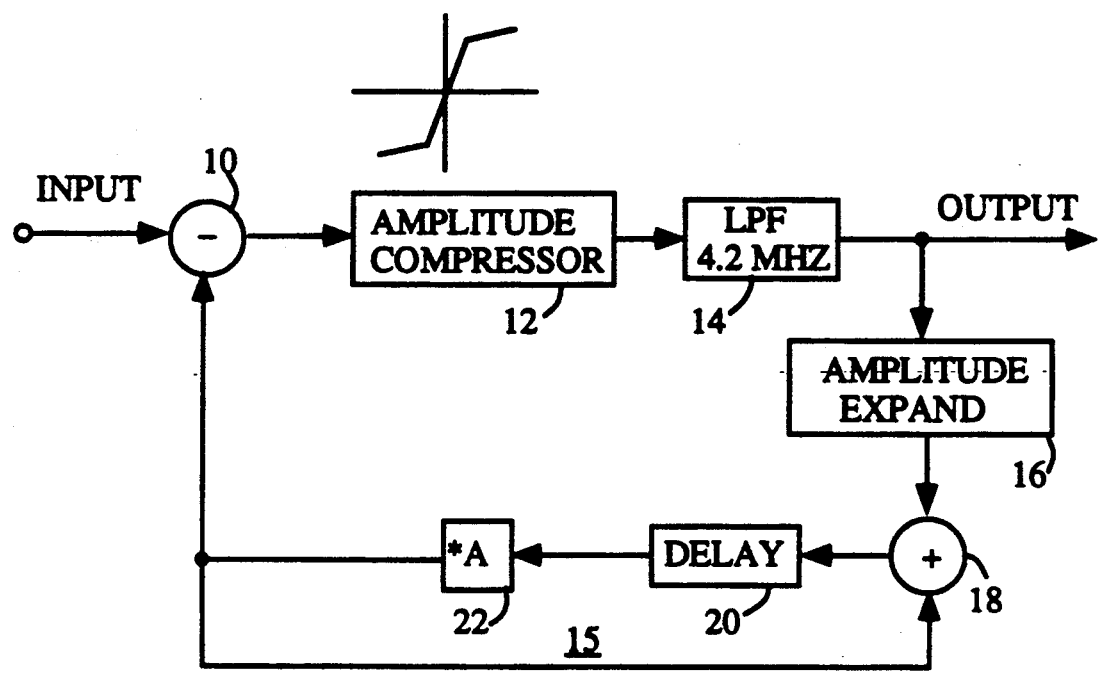
FIGS. 1 and 2 are block diagrams of compansion apparatus which may be utilized for companding video signals in the transmitting and receiving ends of a television system respectively.

In the transmitter arrangement of FIG. 1, an input video signal is applied to one input of a signal subtracter 10, the other input of which receives a signal from a signal predictor network 15 as will be discussed. An output difference signal (DIFF) from subtracter 10 representing a temporally processed video signal, is subjected to nonlinear amplitude compression by means of an amplitude compressor 12 having a nonlinear transfer function as illustrated above block 12. Compressor 12 amplitude compresses large signals greater than a given amplitude threshold and amplitude expands (amplifies) small amplitude signals. Compressor 12 constitutes a component of a companding system together with an amplitude expander, having a complementary transfer function, at a receiver.

The nonlinear transfer characteristic of compressor 12 can generate unwanted high frequency components (e.g. harmonics) which extend above the 4.2 MHz upper limit of the video signal band in this example. These out-of-band high frequency components are filtered by a low pass filter 14 before the OUTPUT signal is transmitted over a channel likely to include signal corrupting noise. Filter 14, however, is likely to introduce unwanted signal distortion of its own. This filter distortion, as well as distortion associated with a mismatch between the compression and expansion functions at the transmitter, particularly in the case of image motion for example, are reduced or eliminated with the cooperation of predictor network 15.

Figure 2:
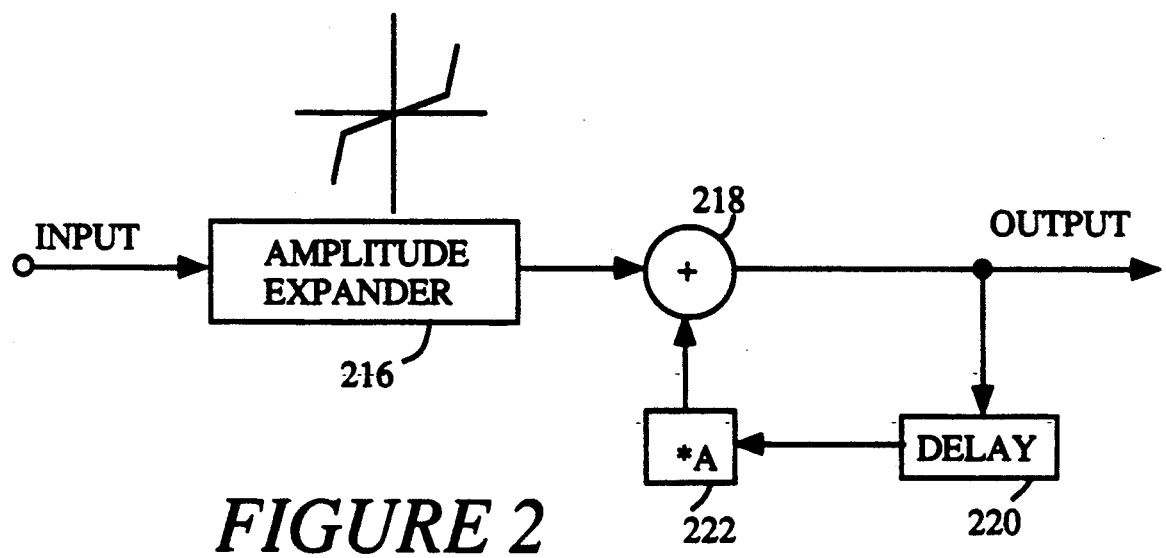

Predictor 15 is a replica of an amplitude expander and predictor network found in a receiver which receives a signal transmitted by the apparatus of FIG. 1. Referring to FIG. 2 for the moment, which is illustrative of receiver compander circuitry, the received input signal, which had been nonlinearly amplitude compressed at the transmitter, is amplitude expanded with the inverse of the transmitter nonlinear transfer function by means of an amplitude expander 216. Expander 216, like Compressor 12 at the transmitter, provides an instantaneous transfer function and may be implemented in the form of a ROM look-up table.

The remaining elements of the FIG. 2 circuitry perform several functions including generating a prediction signal corresponding to the prediction signal produced by the predictor 15 of FIG. 1. In FIG. 2 the output signal from expander 216 is a video difference signal. Adder 218, delay element 220 and amplifier 222 are arranged in a closed loop to form a leaky integrator to integrate the video difference signal and provide a reconstructed video signal at the output terminal of the adder 218. The delay element 220 may be a frame delay and due to the highly redundant nature of video signals, provides at its output a prediction of the current video signal. The output of the delay element 220 is weighted by a factor less than one in the amplifier 222. Amplifier 222 provides a weighted prediction signal which is substantially equal to the prediction signal generated by predictor 15.

The integrator including elements 218, 220 and 222 inherently forms a recursive filter Due to the redundant or correlated characteristics of successive frames of video signals, the recursive filtering action of the integrator tends to increase the signal-to-noise ratio of the signal provided by the adder 218.

The prediction process in the present example involves temporally delayed samples from a single picture point, however it is to be appreciated that it may include a number of samples from spatially related picture points from multiple fields. Nominally the scaling factor "A" is constrained to a value less than unity to maintain the integrating loop stable.

Returning to FIG. 1, the prediction signal from the output of predictor 15 represents an estimate of the delayed receiver output signal, scaled by factor A. Unit 10 subtracts the prediction signal from the input signal to produce a difference signal which is processed by units 12 and 14 to produce the output signal which is transmitted.

At the transmitter apparatus of FIG. 1, the difference signal is the difference between the input signal and prediction signal. The output of adder 18 is a model of the receiver's output. It can be shown that the signal at the receiver's output is similar to the signal applied to the transmitter input. If the difference signal produced by subtracter 10 at the transmitter is small (indicating a good prediction), nonlinear amplitude compressor 12 will amplify the difference signal and thereby advantageously enhance its signal-to-noise characteristics prior to transmission.

With the disclosed system operating with respect to a 4.2 MHz luminance signal a noise reduction of 2.7 db was observed with a scaling factor A of 0.75 and with a $\mu$-law compandor having a companding parameter ($\mu$) of 11. A noise reduction of 4.1 db was obtained for A of 0.90 and $\mu$ of 40.

Figure 3:
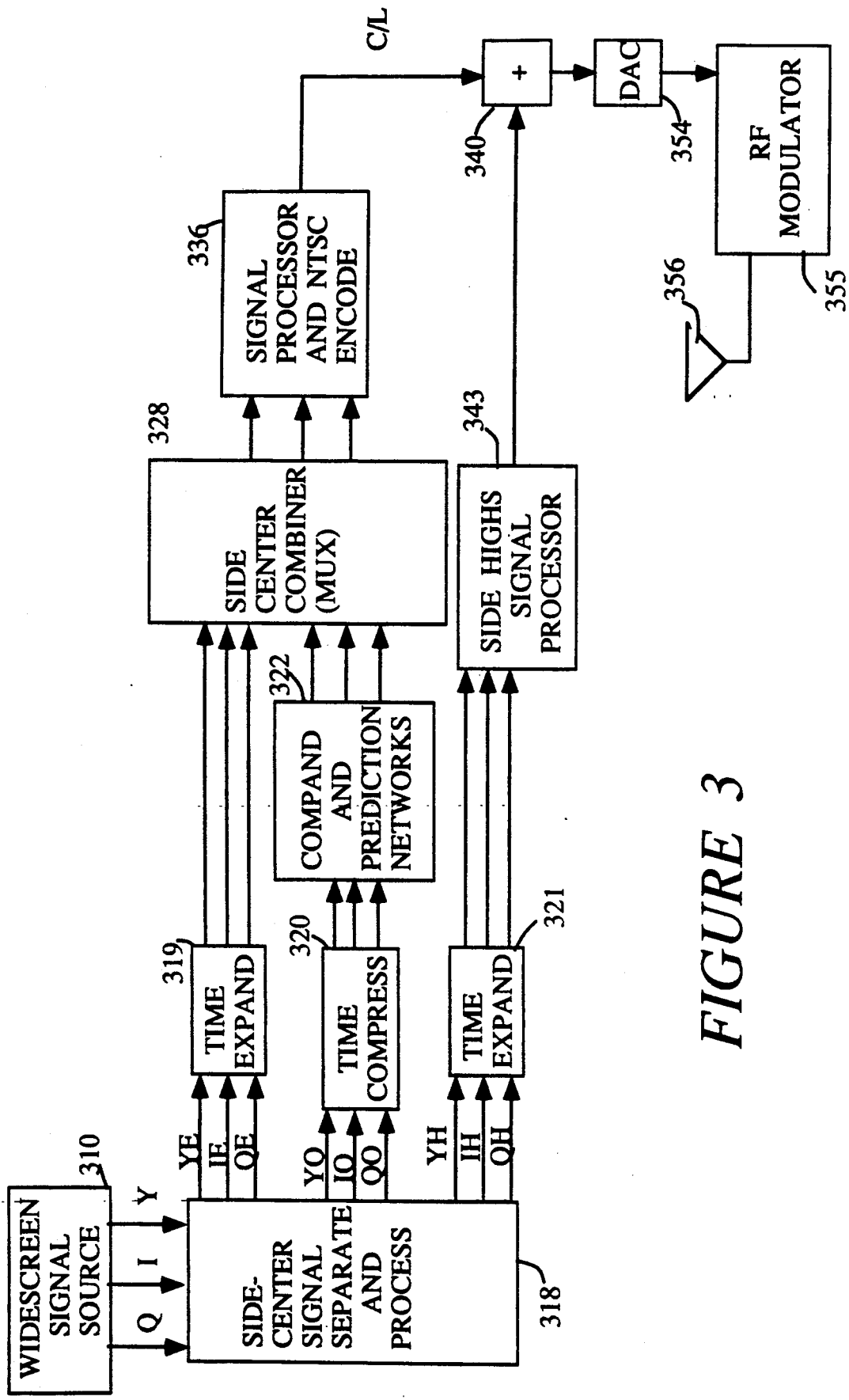
FIGS. 3 and 4 are block diagrams showing inclusion of compansion circuitry in the transmitting and receiving portions respectively of a widescreen television signal processing system.

FIG. 3 shows a block diagram of an encoder for a compatible widescreen television system, e.g for processing a 5:3 wide aspect ratio signal, including compression and prediction networks of the type depicted by FIG. 1. With the exception of such networks, the system of FIG. 3 is disclosed in greater detail in U.S. Pat. No. 4,816,899—Strolle et al.

In FIG. 3 a source of widescreen television signals 310 provides widescreen television color video components Y (luminance) and I, Q (color difference) in digital form. Source 310 also illustratively includes matrix, analog-to-digital converter and low pass filtering circuits. The signals from source 310 are processed by a side-center panel signal separator and processor 318 to produce three groups of output signals YE, IE and QE; YO, IO and QO; and YH, IH and QH. The first two groups of signals (YE, IE, QE and YO, IO, QO) are processed to respectively develop a signal containing a center panel component, and side panel low frequency luminance information (luminance lows) time compressed into horizontal image overscan regions. The third group of signals (YH, IH, QH) is processed to develop a signal containing side panel high frequency information (side panel highs). When the center and side panel signal components are eventually combined, an NTSC compatible widescreen signal with a 4:3 display aspect ratio is produced. Signals YO, IO and QO provide the low frequency side panel information, exclusive of side panel high frequency information, which is inserted into the left and right horizontal overscan regions. Signals YO, IO and QO are individually processed by amplitude compression and prediction networks (of the type shown in FIG. 1) within block 322 before being combined with signals YE, IE and QE by a side-center signal combiner 328, e.g., a time multiplexer. Combiner 328 produces signals YN, IN and QN with a standard 4:3 image aspect ratio.

A signal processor and NTSC encoder 336 processes signals YN, IN and QN to develop an NTSC compatible composite output signal C/SL comprising center panel information, and side panel low frequency information compressed into horizontal overscan regions. Unit 336 includes luminance and chrominance filters, a chrominance modulator, and conventional NTSC encoding circuits for encoding luminance and chrominance information.

Side panel high frequency components YH, IH and QH are additionally processed by a unit 343 after being time expanded by unit 321. In unit 343 the side panel highs modulate an auxiliary suppressed subcarrier with a phase that reverses at the field rate. The modulated subcarrier is subjected to amplitude compression and bandpass filtering to develop a side panel highs signal SH. This signal is combined with signal C/SL in a combiner 340 to produce a widescreen compatible signal NTSC. Signal NTSC is converted to analog form by a digital-to-analog converter (DAC) 354 before being applied to an RF modulator and transmitter network 355 for broadcast via an antenna 356.

Amplitude compression and prediction network 322 can be similarly situated in an enhanced image definition version of the illustrated widescreen encoder system disclosed in the Strolle et al. patent. Such an enhanced definition system is disclosed in a copending U.S Pat. application Ser. No. 139,339 of J.S. Fuhrer titled "Compatible Television System with Companding of Auxiliary Signal Encoding Information. "

Figure 4:
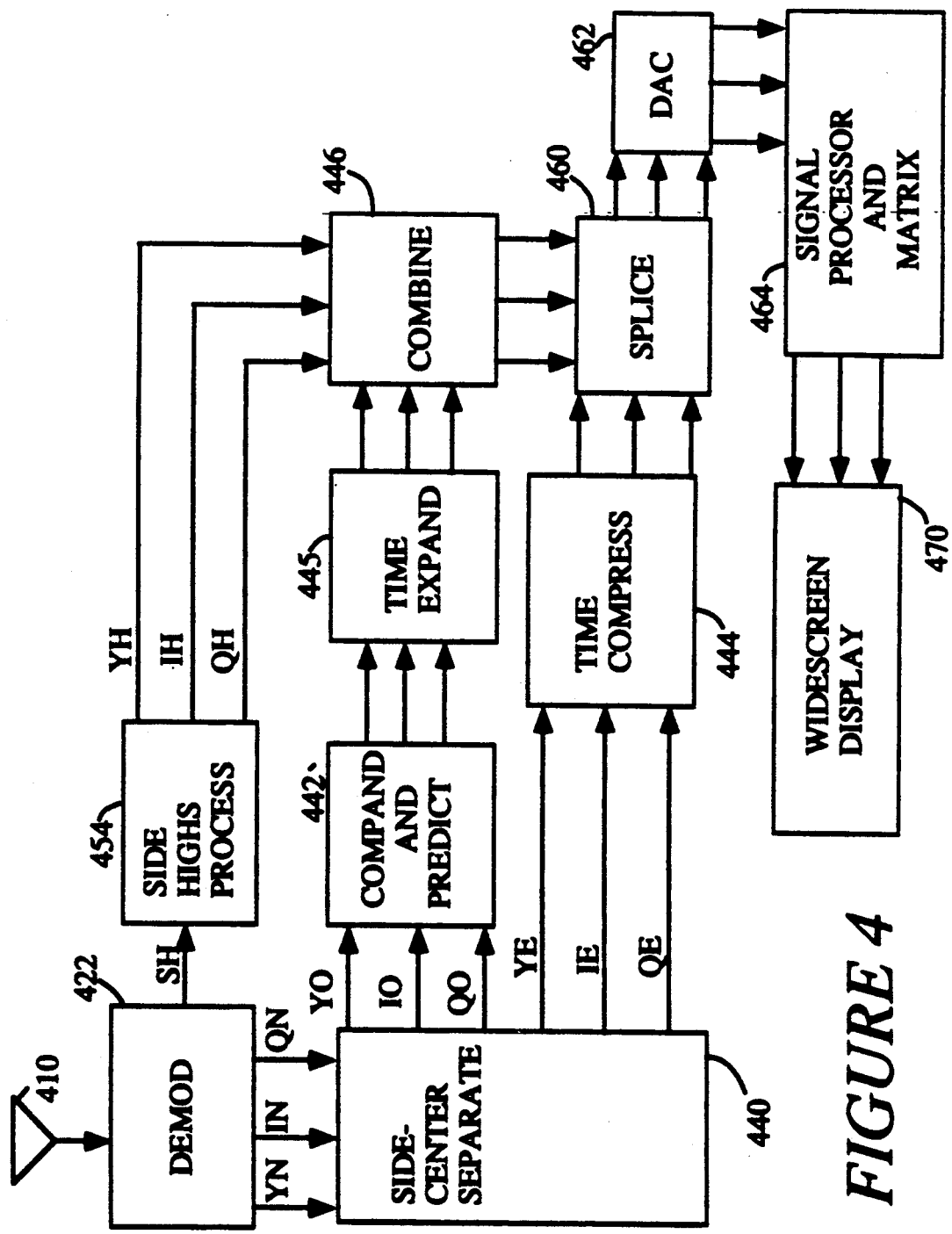

FIG. 4 depicts a block diagram of a widescreen receiver decoder for the compatible widescreen television signal developed by the transmitter encoder of FIG. 3. With the exception of expansion and prediction network 422, the system of FIG. 4 is disclosed in greater detail in the aforementioned Strolle et al. patent The transmitted compatible widescreen signal is received by an antenna 410 and demodulated by an input demodulating and signal processing unit 422 to develop signals YN, IN, QN and side panel highs signal SH. Unit 422 includes filtering and amplitude expanding networks for recovering signal SH, and signal combining, filtering and chrominance demodulation networks for recovering signals YN, IN and QN. A processor 454 responds to side highs signal SH for producing signals YH, IH, and QH. In processor 454 the auxiliary subcarrier is demodulated, luminance and chrominance side panel highs components are separated, and the luminance side panel highs are time compressed to produce side panel highs signal components YH, IH and QH.

Signals YN, IN and QN are separated into low frequency side panel components YO, IO, QO and center panel components YE, IE, QE by means of a side-center separator (de-multiplexer) 440. Signals YE, IE, QE are time compressed by a unit 444 to occupy the prescribed center panel display region. Signals YO, IO, QO are individually subjected to amplitude expansion and predictive signal processing in network 442 before being time expanded by a unit 445 to occupy the prescribed side panel display region. Network 442 contains circuits of the type shown in FIG. 2 for respectively processing signals YO, IO and QO.

Side panel lows signals from time expander 445 and side panel highs signals from processor 454 are combined in a unit 446 to produce side panel luminance and chrominance signals YS, IS and QS. Reconstructed side panel signals YS, IS, QS are spliced to reconstructed center panel signals YC, IC, QC from time compressor 444 by means of a splicer 460 to form a fully reconstructed widescreen signal containing components Y, I and Q.

Widescreen signals Y, I, Q are converted to analog form by means of a digital-to-analog converter (DAC) 462 before being applied to a video signal processor and matrix amplifier 464. The video signal processor component of unit 464 includes signal amplifying, DC level shifting, peaking, brightness control, contrast control and other video signal processing circuits of a conventional nature. Matrix amplifier 464 combines luminance signal Y with color difference signals I and Q to produce color image representative video signals R, G and B. These color signals are amplified by display driver amplifiers in unit 464 to a level suitable for directly driving a widescreen color image display device 470, e.g., a widescreen kinescope.

As noted above, the encoder arrangement of FIG. 3 encodes low frequency side panel information in time compressed form. Illustratively, luminance information from DC to 700 KHz is time compressed approximately 6:1 so that the side panel low frequency information occupies a 4.2 MHz bandwidth. The receiver (FIG. 4) performs a corresponding time expansion as mentioned. The process of nonlinear amplitude compression at the transmitter is particularly likely to generate unwanted out-of-band frequencies when, as in this example, the time compression process produces a signal exhibiting frequencies at or near the upper limit of the desired frequency band (e.g., 4.2 MHz).

Because of time compression and expansion, the side panel low frequency component contains much more noise energy under noisy channel conditions than the same frequency band of center panel information. This condition manifests itself as an objectionable difference in the noise between displayed center panel and side panel images. Specifically, side panel images exhibit horizontally "streaky" low frequency noise which contrasts with the broader bandwidth noise in the center panel image and is more objectionable. Side panel information therefore appears visibly different from center panel information, particularly for transmission channels with signal-to-noise ratios below about 35 db. Thus the apparatus of FIGS. 1 and 2 are advantageously used to enhance the signal-to-noise characteristic of the time compressed side panel low frequency information. The disclosed apparatus alternatively can be employed in the transmitter system of FIG. 3 between unit 318 and time compressor 320, in which case the output signal path of the FIG. 1 apparatus would be low pass filtered to 700 KHz for luminance lows compressed 6:1.

The disclosed signal companding and prediction apparatus also can be used for processing time expanded side panel high frequency signals YH, IH and QH from unit 321 in FIG. 3. In this regard it is noted that, with the FIG. 3 system as illustrated, the side panel high frequency information obtains a signal-to-noise improvement due to time expansion by expander 321. However, this improvement is compromised by the amplitude attenuation which unit 343 imparts to the side highs modulated auxiliary subcarrier to make the modulated auxiliary subcarrier less visible when the widescreen television signal is received by a standard television receiver having a standard 4:3 aspect ratio. The disclosed noise reduction apparatus can be used to enhance the noise immunity of the side highs information, depending on the requirements of a particular system.

Referring again to FIG. 1, it will be appreciated by those skilled in the art of video system design, that the amplitude of the difference signal provided by the subtracter 10 is a function of interframe motion. Consider that the scale factor A is set to unity. In this instance, if successive images are all alike, i.e., representing a still image, the difference signal will be of zero amplitude. Conversely, if successive images are different, the difference signal will represent the differences between successive images and be of greater amplitude. The energy density of the difference signal will increase as the differences between successive images increases.

The degree of noise reduction which can be achieved by compansion is a function of input signal statistics and the dynamic range of the output signal channel. If the dynamic range of the input signal to the compandor for particular signal intervals is known, it is advantageous to selectively tailor the compansion function for the respective dynamic range.

Refer to FIG. 5A which shows an adaptive video signal compansion system having its transfer function selectable responsive to image motion. Input video signal is applied to one input terminal of the subtractor 500, and scaled and frame delayed video signal, from elements 580 and 570, is applied to a second input terminal of subtractor 500. For still images and/or still areas of images the dynamic range and the amplitude of the differences provided by the subtractor 500 will be relatively small. For moving images and images in which the brightness level changes, the dynamic range and amplitude of the differences increase.

The difference values from subtractor 500 are applied to a compandor circuit 510 which has selectable transfer functions with a slope greater than one for a predetermined amplitude range of input signals (e.g., about zero)

and a slope less than one for amplitudes of the input signal outside the predetermined range. Output signal from the compandor 510 is transmitted to a receiving apparatus (not shown). Output signal from the compandor 510 is also coupled to a compandor 520 which performs the inverse function of the compandor 510. Compander 520 emulates the compandor resident in the receiving apparatus. Expanded difference values from the compandor 520 are coupled to circuitry including an adder 560, delay element 570 and scaler 580, which integrates the expanded difference signal to produce a scaled prediction of the input signal. In this embodiment the total delay around the loop between the output and second input terminals is one image period, for example one horizontal line interval, one field interval or one frame interval, etc. The signal delay provided by the delay element 570 is selected to satisfy this constraint. In view of this constraint it may be necessary to include compensating delay elements in certain signal paths as for example between elements 580 and 560. However, one familiar with circuit designs will readily realize such requirements and include the necessary elements.

Interimage period signal changes or interimage motion may be detected by subtracting video signals from successive image periods. This is accomplished in subtractor 550 by subtracting the current video sample applied to the delay element 570, from video signal delayed one image period output from delay element 570. The motion signal provided by subtractor 550 is applied to a low pass filter 540 to ameliorate the effect of noise or quantization errors in the video signals and/or to preclude abrupt motion signal changes. The low pass filtered motion signal is coupled to a compandor control circuit 530 which determines the transfer characteristics of the compandors 510 and 520.

The compandor control circuit 530 and the compandor circuit 510 (520), in a digital signal processing implementation, may be realized with the circuit elements 531 and 511 respectively, shown in FIG. 5B. The compandor control circuit 531 is a read only memory (ROM) having the motion signal from the low pass filter 540 applied to its address input port. ROM 531 is preprogrammed at its respective storage locations to output the appropriate control signal corresponding to the respective address values. For example the ROM 531 may be programmed to provide a control signal of binary value 00 for address values of 0-20 units, a binary control value of 01 for address values of 21-40 units, a binary control value of 10 for address values of 41-60 units and a binary control value of 11 for address values greater than 60 units, etc.

The compandor 511 is a further ROM having the video signal coupled to ones of its address input terminals and the control signals coupled to others of its address input terminals. ROM 511 has its storage locations arranged as a plurality of tables, each table being programmed with a particular compansion function. The particular table utilized is determined by the value of the control signal. The video difference signal addresses the respective storage locations in the table utilized, which locations are preprogrammed with companded output signals corresponding to the respective address values. For example ROM 511 may include four tables which are selected by control addresses 00, 01, 10 and 11. Assume that those control addresses correspond to the control values set forth in the example for ROM 531. In this instance the compansion function defined by the tables addressed by successively larger control values may be designed to optimally compand input signals having successively greater amplitudes.

Figure 6:
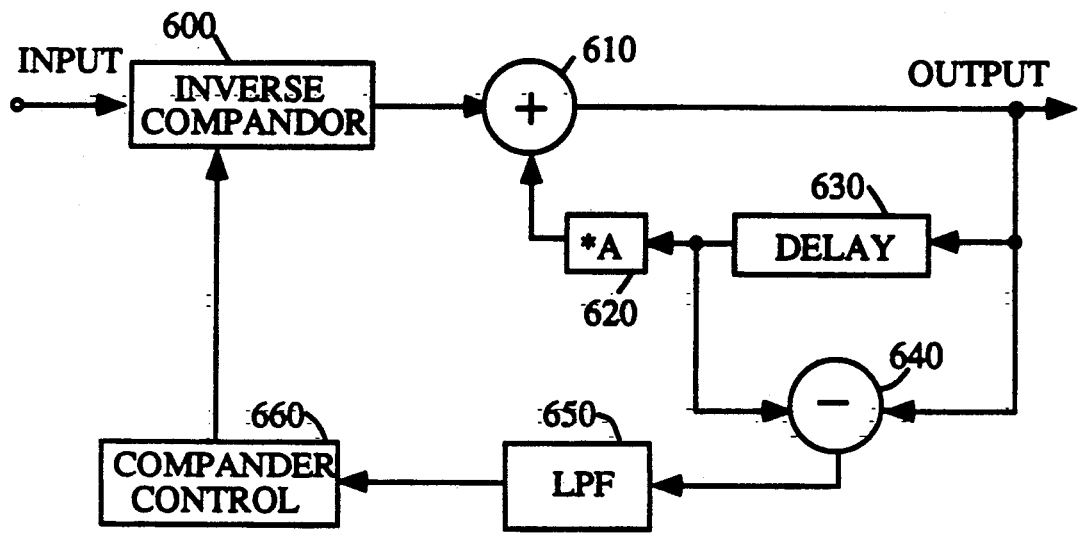

FIG. 6 illustrates the receiver portion of the adaptive compansion system. In FIG. 6 the transmitted companded video difference signal is coupled to the compandor 600 which is similar to the compandor 520 of FIG. 5A. The expanded video difference signal provided by compandor 600 is applied to the circuit elements including adder 610, delay element 630 and scaler 620 which integrate the video difference signal to regenerate the original video signal. Motion detection circuitry, similar to the motion detection circuitry in FIG. 5A, including the subtractor 640 coupled to the delay element 630, and the low pass filter 650 generates a motion signal which is coupled to the compandor control circuit 660. Responsive to the motion signal, the compandor control circuit 660 adaptively controls the transfer characteristics of the compandor 600.

The compandor 510 in the transmitting system develops a robust signal which is not significantly affected by noise in the transmission channel. Therefore, the signal applied to the compandor 600 in the receiver is substantially similar to the signal applied to the compandor 520 in the transmitter. Since the circuitry of FIG. 6 is similar to the combination of circuit elements 520-580 of FIG. 5A, it will accurately emulate its response. Further, since the circuitry in FIG. 5A is arranged in a closed feedback loop to minimize processing errors, the output from adder 560 and therefore the output of adder 610 are accurate representations of the original input signal.

Figure 7:
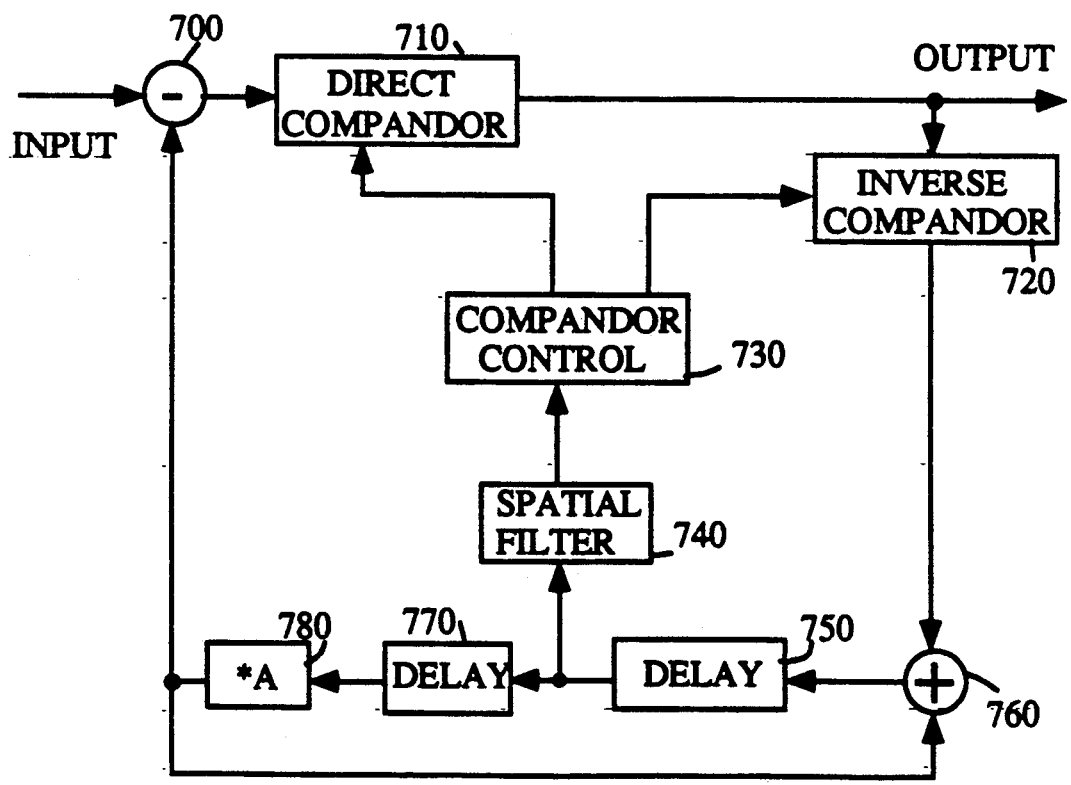
FIGS. 7 and 8 are block diagrams of an alternative embodiment of adaptive compansion circuitry in the transmitting and receiving portions respectively, of a television signal transmitting system.

FIG. 7 is an alternative embodiment of an adaptive compansion system. The FIG. 7 apparatus operates similarly to the FIG. 5A apparatus except in the generation of the compandor control signal generation. In FIG. 7 the compandors 710 and 720 are adjusted to the expected dynamic range of the signal differences provided by the subtractor 700 rather than to image motion.

Assume that the range of values of the input signal is from zero to 100 units. The dynamic range of the differences provided by subtractor 700 is thus 200 units, i.e., from −100 to +100 units. However, if the amplitude of the input signal can be predicted then the dynamic range of the difference signal can be predicted. Assume the amplitude of the input signal is predicted to be X, then the amplitude range of the difference signal will be from −X to 100−X units. For example, if X is predicted to be 25 and the actual input signal is one of the extremes of zero or 100, then the difference signal will be −25 or +75, having a dynamic range of 100 units. Therefore, from an amplitude prediction of the value of the input signal, the dynamic range of the signal provided by subtractor 700 is reduced by a factor of ½. This is a floating dynamic range in that it is not fixed about specific amplitude limits. However, knowing the predicted value of the input signal, at any instance in time the limits of the floating dynamic range are known and the transfer characteristics of the compandor can be selected according to the relative position of the current dynamic range of the signal difference.

In FIG. 7 the delay in the integrating loop is split between two elements 770 and 750. The combined delay of these elements is selected so that the total delay around the loop between the output and input terminals of the subtractor 700 is one image period. The delay is split so that the predictor circuitry may be arranged such that its response timing is properly time aligned to the signal applied to the compandors.

Input signal level prediction is accomplished by spatially filtering or averaging, in a filter 740, a number of pixels from, for example, a previous frame, disposed about the corresponding pixel currently represented by the input signal. The predicted signal value from the spatial filter 740 is coupled to the compandor control circuit 730. It may be desirable to low pass filter the prediction signal provided by the spatial filter 740 to preclude noise corrupting the process or to prevent excessive changing of the compansion function.

The compandor control 730 and the compandor circuit 710 (720) may be arranged similarly to the apparatus of FIG. 5B. In this instance the control ROM 531 will be preprogrammed with control values corresponding to the expected dynamic range $(-X, R-X)$ of the difference signal where X is the prediction value and R is the maximum value of the input signal (assuming the input signal ranges between 0 and R).

The compandor ROM 511 will be preprogrammed with respective tables of transfer functions appropriate for the different signal dynamic ranges determined by the control signals.

Figure 8:
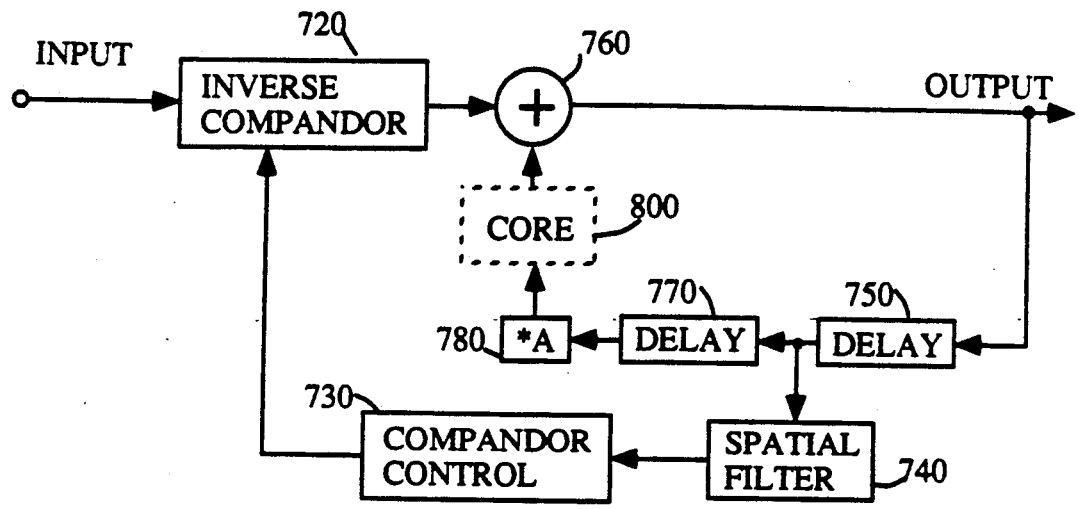

FIG. 8 illustrates the complementary compansion apparatus at the receiving end of the FIG. 7 compansion system. In FIG. 8 it can be seen that the circuitry, exclusive of the optional coring circuit 800 which will be explained later, includes similar signal prediction and compandor control circuitry as the FIG. 7 apparatus. Elements in FIG. 8 designated with like numbers to elements in FIG. 7 perform like functions.

Figure 9:
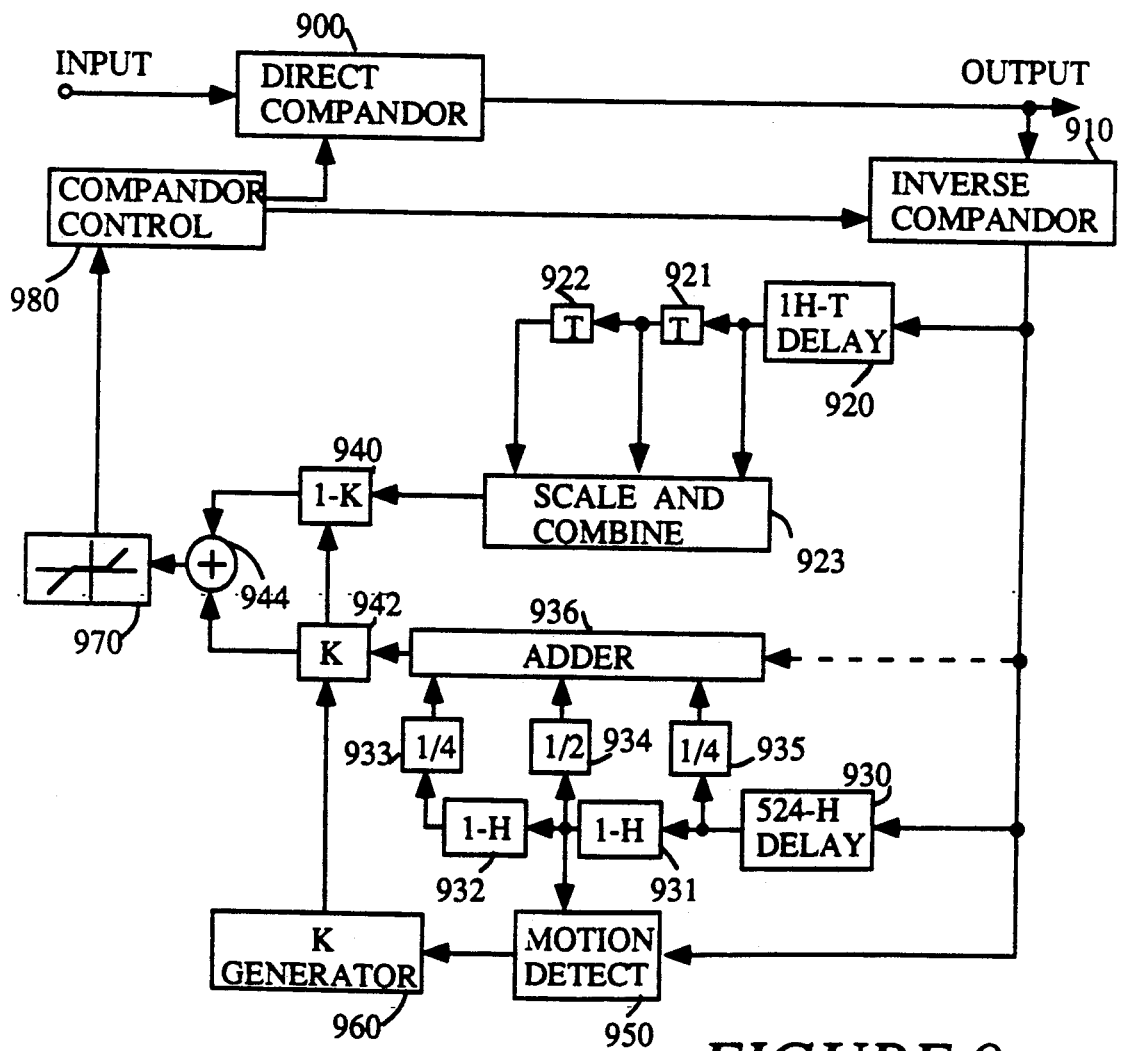
FIGS. 9 and 10 are block diagrams of a further alternative adaptive video signal compansion system including compansion circuitry in the transmitting and receiving end of the system respectively.

FIG. 9 illustrates a further embodiment of video signal adaptive compansion circuitry. This circuitry, however, operates directly on the video signal rather than video signal differences.

Figure 11:
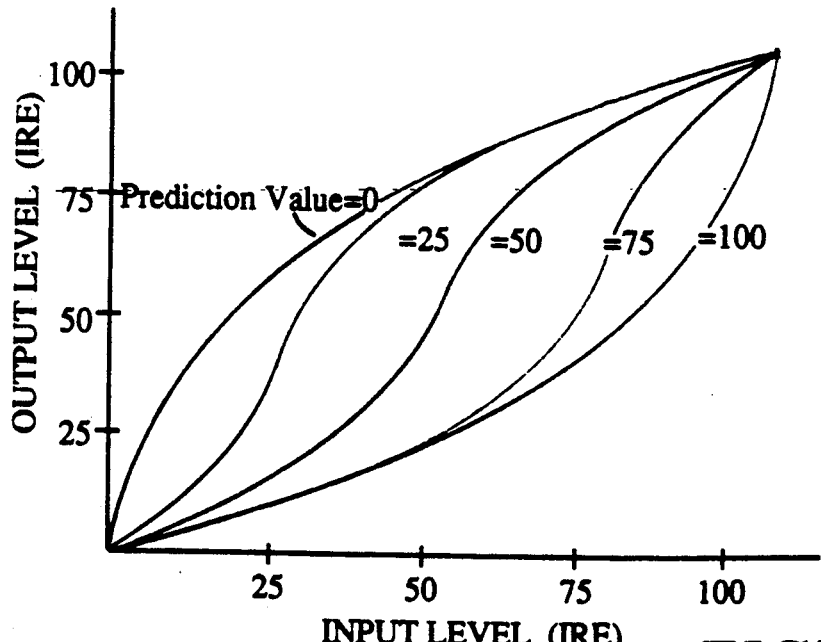
FIG. 11 illustrates a plurality of compandor transfer characteristics which may be implemented in an adaptive compandor.

Typically compandors (at the transmitting end of a system) operate to expand the amplitude of low amplitude signals and compress the amplitude of higher amplitude signals to effect an improvement of signal-to-noise ratio. Such a process tends to enhance the quality of the lower level signals, but does little to improve higher level signals. On the other hand if the relative amplitude of the signal to be processed is known, by adaptive compansion, the signal-to-noise ratio of signals of almost any level can be improved. This is accomplished by selecting a compansion transfer characteristic which has its greatest slope located in the range of amplitudes in which signal samples are expected to occur. Consider the compansion curves illustrated in FIG. 11 which are applicable for a compandor implemented in the transmitting end of a compansion system. (It will be appreciated that by changing the axis designation from Input and Output to Output and Input, the curves will correspond to the inverse or receiving end compansion curves.) It can be seen that if the amplitude of the input signal is expected to be between, e.g., 80 and 100 IRE, signal in this range will be expanded, and lesser amplitude signals will be compressed. Alternatively, if the signal is expected to be 50 IRE, signals in the range of about 50±10 IRE will be expanded and signals of greater and lesser amplitude will be compressed. It may be said that a system which operates in this manner is an amplitude tracking compansion system. It happens that the high correlation of video signals from line-to-line, field-to-field, or frame-to-frame permits the realization of such a tracking compansion system.

In FIG. 9, video signal to be companded is applied to a multicharacteristic compandor 900 which provides a companded signal to be transmitted at the terminal OUTPUT. Compandor 900 may be a ROM programmed with a plurality of tables of transfer characteristics, each table defining one companding characteristic such as those illustrated in FIG. 11. The selection of the particular table used at any given time is determined by a control signal developed by the compandor control circuit 980.

The companded signal is also coupled to inverse compansion circuitry including elements 910-980 which emulates the expansion circuitry at the receiving end of the transmission system. Expanded signal from the compandor 910 is applied to a first signal prediction circuit including elements 920-923 and to a second signal prediction circuit including elements 930-936.

The second prediction circuit includes the cascade arrangement of a delay element 930 which delays signal by substantially one video frame period minus one horizontal line period, and delay elements 931 and 932 each of which delay signals by one horizontal line period. Video signals from the delay elements 930, 931 and 932 are coupled to signal weighting circuits 935, 934 and 933 respectively. The weighting circuits 935, 934 and 933 scale the signals applied thereto by the factors $\frac{1}{4}$, $\frac{1}{2}$ and $\frac{1}{4}$ respectively. Video signal from the weighting circuits 933-935 are summed in an adder circuit 936 which generates a prediction signal temporally related to the current video signal. The temporal prediction signal from adder 936 is coupled to a variable weighting circuit 942 which scales the temporal prediction signal by a variable factor K provided by a control signal generator 960.

The temporal prediction signal may include contributions from the current image. This is indicated by the broken arrow connection between the output of the compandor 910 and the adder circuit 936. This connection is intended to imply that signal from one or more picture points of the current image frame may be weighted and combined with the signals from the previous frame.

The first prediction circuit develops a prediction signal from signal from the current image field. In the exemplary embodiment of FIG. 9, output signal from compandor 910 is delayed by one horizontal line period minus T in delay element 920. The time T is a short time period typically equal to one quarter of the period of the color subcarrier or a multiple thereof. The delayed signal is further delayed in the cascade connected delay elements 921 and 922 each of which provides a delay of period T. Delayed signals from delay elements 920-922 are coupled to scaling and combining circuitry 923 which develops a spatial prediction signal. The scaling and combining circuitry 923 may be similar to elements 933-936 of the temporal prediction circuit. The spatial prediction signal provided by element 923 is coupled to a variable weighting circuit 940, which scales the spatial prediction signal by a variable factor $(1-K)$ provided by the control circuit 960.

For non-moving images, or areas of images which contain no interframe motion, the temporal average tends to be a more accurate prediction of the current signal. For moving images, or areas of images that contain interframe motion, the spatial average tends to be a more accurate prediction of the current signal. In order that the system perform well for both conditions of image motion and non-motion, the expanded signal from the compandor 910 is monitored for motion to enable selection of the appropriate prediction signal.

A motion detector 950 is coupled between the input to delay element 930 and the output of delay element 931. Motion detector 950 provides a signal corresponding to interframe image signal differences. This difference signal is coupled to the control signal generator 960 which generates variable control signals, K, for particular ranges of the difference signal. For image areas containing no motion, i.e., when the difference signal provided by the motion detector 950 is zero, the control signal generator provides a K value corresponding to one. In this instance the weighting circuits 942 and 940 are respectively conditioned to pass the temporal prediction and exclude the spatial prediction. When the motion detector generates a large amplitude difference signal, indicating significant image motion, generator 960 provides a value of K corresponding to zero which conditions the weighting circuits 940 and 942 to pass the spatial prediction to the exclusion of the temporal prediction. For intermediate valued image difference signals, generator 960 develops values of K intermediate zero and one, which values of K condition the weighting circuits 940 and 942 to pass the spatial and temporal prediction signals in complementary proportions.

The weighted spatial and temporal prediction signals from the weighting circuits 940 and 942 are coupled to an adder circuit 944 which provides a sum corresponding to the desired prediction signal. The prediction signal, from the adder circuit 944, is coupled to the compandor control circuit 980. The compandor control circuit 980, responsive to the prediction signal from the adder circuit 944, develops appropriate control signals to condition the compandors 900 and 910 to operate according to a particular one of its selectable transfer characteristics. Note the compandor control circuit 980 and the compandor 900 (910) may be configured similar to the circuitry illustrated in FIG. 5B.

Figure 10:
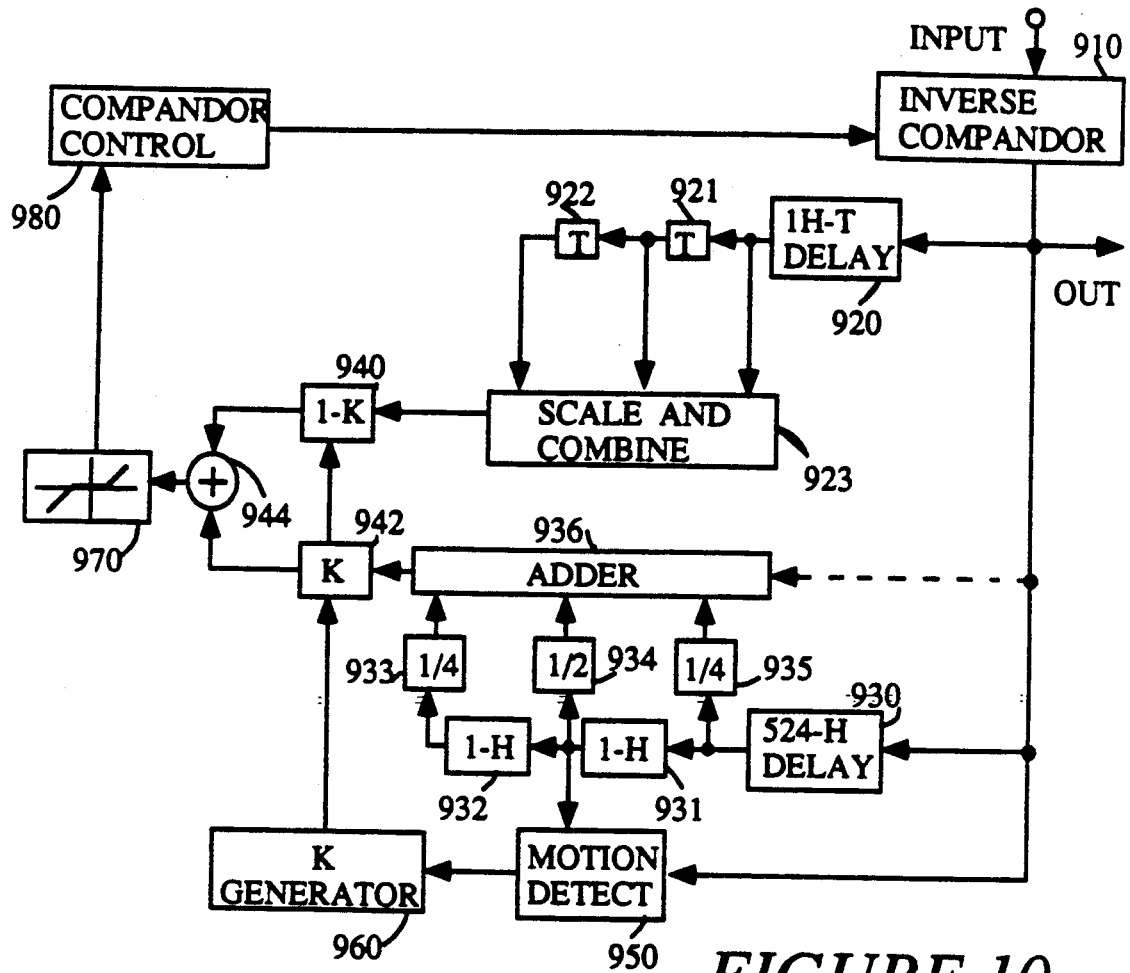

FIG. 10 illustrates compansion circuitry for the receiving end of a system incorporating the compansion circuitry of FIG. 9 at the transmitting end of the system. Elements designated with like numerals as elements in the FIG. 9 apparatus are similar and perform like functions.

Refer back to FIG. 8 and consider the recursive loop including elements 750–780. This recursive loop tends to increase the noise power at the output of the adder 760, even though the loop improves the signal to noise ratio. The increase in noise power can be reduced by incorporating a coring circuit 800 between the weighting circuit 780 and the adder 760. If such coring circuit is included in the FIG. 8 circuitry, a similar coring circuit should also be included at the output of the weighting circuit 780 in FIG. 7 so that the prediction signals generated by both the FIG. 7 and FIG. 8 apparatus are similar. The coring circuit 800 may be of conventional design having a transfer function which clamps signal in a particular range of amplitude to a predetermined value, and which passes signal outside the particular range substantially unaltered. For example, the coring circuit may pass all signal amplitude values which are greater and lesser than plus and minus, e.g., 5 IRE respectively, and clamp signal amplitudes of between plus and minus 5 IRE to a zero IRE value. Alternatively, the coring circuit may be of the adaptive type as for example the coring circuit set forth in U.S Pat. No. 4,538,236 which is incorporated herein by reference.

It may be desirable to include coring circuitry in any of the FIG. 1, FIG. 2, FIG. 5A and FIGS. 6–10 apparatus, and such coring circuitry may be included at locations other than the output of the weighting circuit (e.g., 780). For example, in FIGS. 7 and 8 a coring circuit may be included between the adder 760 and the delay element 750, or between the compandor 720 and the adder 760. In each instance the effect will be a reduction of noise power at the output of the adder 760. It is also advantageous to include coring circuitry between the delay element 750 and the compandor control circuitry 730.

Coring circuitry may also be used to advantage to reduce quantization errors An example is the coring circuit 910 included between the adder circuit 944 and the compandor control circuit 980 in FIGS. 9 and 10. Consider that generator 960 is configured to generate only nine different values of K corresponding to 0, ⅛. . . . ⅞, 1 and that the weighting circuits 940 and 942 are of the bit shift and add type. In this instance the output of the adder 944 may produce sums with quantization errors. Such quantization errors tend to be more significant for low amplitude signals. Therefore, it is desirable to eliminate the possibility of errors over the lowest range of prediction signals. The coring circuit 970 has a transfer function which provides a zero valued output signal for a predetermined range of signal amplitudes about zero, and passes all other signals, thereby eliminating quantization errors for low level signals.

It will be appreciated that compensating delay elements may be required in certain signal paths in each of the circuits of FIGS. 5–10 in order to appropriately time align predicted signals and/or control signals with the current input sample. However, those persons skilled in the art of circuit design will readily recognize where such delays are necessary and incorporate them in their systems. Further, lowpass filters may be included between the direct and inverse compandors in the circuitry of FIGS. 5A, 7 or 9 to eliminate out of band frequency components generated by nonlinear compansion. Finally, it will be recognized that the apparatus of FIGS. 5A, 7 or 9 may be incorporated in the FIG. 3 widescreen video signal transmission system and the apparatus of FIG. 6, 8 or 10 may be incorporated in corresponding FIG. 4 widescreen video signal receiving system. While compansion circuitry is shown only in the side panel low frequency signal paths of FIGS. 3 and 4, similar compansion circuitry of the type described herein may also be included in the side panel high frequency signal paths.

What is claimed is:

1. An adaptive compansion system for processing a video signal comprising:
   means for applying an adaptively companded signal representing a video signal;
   an adaptive compandor having an output terminal and a control terminal, and having a plurality of compansion transfer characteristics selectably responsive to a control signal applied to said control terminal, said adaptive compandor being responsive to said adaptively companded signal for performing a compansion function to produce a non-companded signal representing said video signal;
   means coupled to the output terminal of said adaptive compandor for providing an output video signal;

means responsive to said output video signal for generating a signal indicative of an attribute of said video signal;

means responsive to said signal indicative of an attribute of said video signal for generating said control signal.

2. The adaptive compansion system set forth in claim 1 wherein said means for generating a signal indicative of an attribute includes a motion detector for generating a motion signal indicating interimage motion.

3. The adaptive compansion system set forth in claim 2 wherein said means for generating a signal indicative of an attribute further includes:

means responsive to said output video signal for generating a spatial prediction of the amplitude of said video signal represented by said adaptively companded signal;

means responsive to said output video signal for generating a temporal prediction of the amplitude of said video signal represented by said adaptively companded signal; and means responsive to said motion signal, said spatial prediction and said temporal prediction for generating said signal indicative of an attribute.

4. The adaptive compansion system set forth in claim 3 including a coring circuit for coupling said signal indicative of an attribute to said means for generating said control signal.

5. The adaptive compansion system set forth in claim 1 wherein the means for generating a signal indicative of an attribute includes means responsive to said output video signal for generating a signal representing a spatial prediction of the amplitude of said video signal represented by said adaptively companded signal.

6. The adaptive compansion system set forth in claim 5 wherein the means for generating a signal indicative of an attribute further includes:

means responsive to said output video signal for generating a signal representing a temporal prediction of said video signal represented by said adaptively companded signal; and means for combining said signals representing said spatial and temporal predictions to generate said signal indicative of an attribute.

7. The adaptive compansion system set forth in claim 5 including a coring circuit for coupling said signal representing said spatial prediction to said means for generating said control signal.

8. The adaptive compansion system set forth in claim 1 wherein said means for generating a signal indicative of an attribute includes means responsive to said output video signal for generating a signal representing a prediction of the amplitude of video signal represented by said adaptively companded signal.

9. The adaptive compansion system set forth in claim 8 further including a coring circuit for coupling said signal representing a prediction to said means for generating said control signal.

10. The adaptive compansion system set forth in claim 8 including coring circuitry for coupling said output video signal to said means for generating a signal representing a prediction.

11. The adaptive compansion system set forth in claim 1 wherein said adaptively companded signal representing a video signal is a companded difference signal representing differences of video signals from successive image periods and said means for providing said output video signal comprises:

signal combining means having a first input coupled to the output terminal of said adaptive compandor, having a second input terminal, and having an output terminal for providing said output video signal;

delay means having an input terminal coupled to the output terminal of said signal combining means, and having an output terminal, said delay means for delaying a signal applied thereto by substantially one image period; and a weighting circuit, having input and output terminals respectively coupled to the output terminal of said delay means and the second input terminal of said signal combining means, for scaling a signal applied thereto by a factor of one or less.

12. The adaptive compansion system set forth in claim 11 further including a signal coring circuit coupled between the output terminal of said signal combining means and the input terminal of said delay means.

13. The adaptive compansion system set forth in claim 11 further including a coring circuit coupled between the output terminal of said delay means and the second input terminal of said signal combining means.

14. The adaptive compansion system set forth in claim 11 wherein said means for applying an adaptively, companded signal representing a video signal includes:

a video signal input terminal for providing an input video signal;

subtractive signal combining means having a first input terminal coupled to said video signal input terminal, having a second input terminal and an output terminal;

a further adaptive compandor having an input terminal coupled to the output terminal of said subtractive signal combining means, having an output terminal for providing said adaptively companded signal representing said video signal, and having a control input terminal coupled to said means for generating said control signal, said further adaptive compandor responsive to said control signal for performing the inverse compansion function to said adaptive compandor; and means for coupling the output terminal of said weighting circuit to the second input terminal of said subtractive signal combining means.

15. The adaptive compansion system set forth in claim 14 including a signal coring circuit coupled between the output terminal of said signal combining means and the input terminal of said delay means.

16. The adaptive compansion system set forth in claim 14 including a signal coring circuit coupled between the output terminal of said delay means and the second input terminal of said signal combining means.

17. The adaptive compansion system set forth in claim 1 wherein said means for applying an adaptively companded signal representing a video signal comprises:

a video signal input terminal for providing an input video signal;

a further adaptive compandor having an input terminal coupled to said video signal input terminal, having an output terminal for providing said adaptively companded signal representing a video signal and having a control terminal coupled to said means for generating a control signal, said further adaptive compandor responsive to said control signal for performing an inverse compansion function to said adaptive compandor.

18. The adaptive compansion system set forth in claim 1 wherein said adaptively companded signal representing a video signal is a companded difference signal representing differences of video signals from successive image periods and said means for providing said output video signal comprises:

signal combining means having a first input coupled to the output terminal of said adaptive compandor, having a second input terminal, and having an output terminal for providing said output video signal;

delay means having an input terminal coupled to the output terminal of said signal combining means, and having an output terminal coupled to the second input terminal of said signal combining means, said delay means for delaying a signal applied thereto by substantially one image period.

19. The adaptive compansion system set forth in claim 18 wherein said means for applying an adaptively companded signal representing a video signal includes:

a video signal input terminal for providing an input video signal;

subtractive signal combining means having a first input terminal coupled to said video signal input terminal, having a second input terminal and an output terminal;

a further adaptive compandor having an input terminal coupled to the output terminal of said subtractive signal combining means, having an output terminal for providing said adaptively companded signal representing said video signal, and having a control input terminal coupled to said means for generating said control signal, said further adaptive compandor responsive to said control signal for performing the inverse compansion function to said adaptive compandor; and means for coupling the output terminal of said delay means to the second input terminal of said subtractive signal combining means.

20. An adaptive compansion system for processing video signals includes a compandor having an input terminal for receiving a video signal an output terminal for providing processed video signal, said compandor having a plurality of compansion characteristics selectably responsive to a control signal and means coupled to the output terminal of said compandor and responsive to said processed video signal for generating said control signal to selectably control said compandor.

* * * * *